(12) United States Patent
Toya et al.

(10) Patent No.: US 8,242,740 B2
(45) Date of Patent: Aug. 14, 2012

(54) BATTERY CHARGER WITH CHARGING STATUS INDICATOR IN BATTERY COMPARTMENT

(75) Inventors: Shoichi Toya, Minamiawaji (JP); Eiji Satsuma, Sumoto (JP); Masahiro Sugita, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 266 days.

(21) Appl. No.: 12/844,152

(22) Filed: Jul. 27, 2010

(65) Prior Publication Data

US 2011/0025259 A1 Feb. 3, 2011

(30) Foreign Application Priority Data

Aug. 3, 2009 (JP) ................................. 2009-180908

(51) Int. Cl.
*H02J 7/00* (2006.01)
(52) U.S. Cl. .......................... 320/107; 320/110; 320/113
(58) Field of Classification Search .................. 320/107, 320/110, 113, DIG. 18–DIG. 21
See application file for complete search history.

(56) References Cited

U.S. PATENT DOCUMENTS

| | | | |
|---|---|---|---|
| 5,767,659 A * | 6/1998 | Farley | 320/106 |
| 6,078,164 A * | 6/2000 | Park | 320/107 |
| 7,187,156 B2 | 3/2007 | Nakasho et al. | |
| 7,285,935 B2 * | 10/2007 | Fuge | 320/132 |
| 7,679,312 B2 * | 3/2010 | Toya et al. | 320/101 |
| 7,746,030 B2 * | 6/2010 | Ziegler et al. | 320/132 |

FOREIGN PATENT DOCUMENTS

JP 2006-74860 3/2006

* cited by examiner

*Primary Examiner* — Richard V Muralidar
(74) *Attorney, Agent, or Firm* — Wenderoth, Lind & Ponack, LLP

(57) ABSTRACT

The battery charger has a case 1 that has a battery compartment 2 to load a plurality of rechargeable circular cylindrical batteries 3 arranged in parallel orientation in a detachable manner, a charging circuit 10 housed in the case 1 to charge the batteries loaded in the battery compartment 2, and a charging status indicator 4 that detects the charging status of batteries loaded in the battery compartment 2 and indicates the battery charging status by light illumination conditions. The indicator 4 is provided with light sources 6 disposed at the end of the battery compartment 2 that shine light from between adjacent parallel circular cylindrical batteries 3 in the lengthwise direction onto the battery surfaces. These battery charger light sources 6 shine light on the surfaces of adjacent circular cylindrical batteries 3 to indicate the charging status of the circular cylindrical batteries 3 loaded in the battery compartment 2.

17 Claims, 11 Drawing Sheets

BATTERY CHARGER WITH CHARGING STATUS INDICATOR IN BATTERY COMPARTMENT

BACKGROUND OF THE INVENTION

1. Field of the Invention

The present invention relates to a battery charger that charges a plurality of circular cylindrical batteries that are loaded in a detachable manner in the battery charger, and in particular to a battery charger that indicates the charging status of the circular cylindrical batteries via light.

2. Description of the Related Art

A battery charger has been developed having a battery compartment established in the surface of the case that indicates via light the charging status of the batteries loaded in the battery compartment. (Refer to Japanese Laid-Open Patent Publication 2006-74860.)

In this battery charger, through-holes or translucent regions are provided in the case, pilot-lights are disposed inside the case, and light from the pilot-lights shines through the case to indicate the charging status of the batteries.

SUMMARY OF THE INVENTION

In the battery charger of JP 2006-74860, pilot-lights that light to indicate the charging status are established in regions separated from the batteries. Consequently, the battery charger has the drawback that when the user observes an illuminated pilot-light, it is not clear whether the light indicates the battery charging status or that the battery charger is operable and ready to charge batteries. Further, since pilot-light illumination relies on devices such as light emitting diodes (LEDs) disposed inside through-holes or translucent regions in the case, the light emitting area is extremely small and the battery charger has the drawback that the user cannot easily and clearly discern the indicated charging status. If the brightness of the pilot-lights is increased for clear indication to the user, the bright light emission in a small area becomes glaring. Further, this battery charger has the drawback that if brightness is reduced to prevent glare, indication cannot be clearly discerned by the user.

The present invention was developed with the object of correcting the drawbacks described above. Thus, it is an important object of the present invention to provide a battery charger that can clearly indicate to any user (in an easily discernable manner) the charging status of circular cylindrical batteries. Further, it is another important object of the present invention to provide a battery charger that can clearly indicate battery charging status by illuminating the surfaces of the circular cylindrical batteries being charged with light shined over a wide area of the battery surfaces rather than glaring indication with bright illumination over a small area.

The battery charger of the present invention is provided with a case 1 that has a battery compartment 2 to load a plurality of rechargeable circular cylindrical batteries 3 arranged in parallel orientation in a detachable manner, a charging circuit 10 housed in the case 1 to charge the batteries loaded in the battery compartment 2, and a charging status indicator 4 that detects the charging status of batteries loaded in the battery compartment 2 and indicates the battery charging status by light illumination conditions. The indicator 4 is provided with light sources 6 disposed at the end of the battery compartment 2 that shine light from between adjacent parallel circular cylindrical batteries 3 in the lengthwise direction onto the battery surfaces. These battery charger light sources 6 shine light on the surfaces of adjacent circular cylindrical batteries 3 to indicate the charging status of the circular cylindrical batteries 3 loaded in the battery compartment 2.

The battery charger described above has the characteristic that the charging status of the circular cylindrical batteries can be clearly indicated in a manner easily discernable by any user. This is because the battery charger described above illuminates the surfaces of the circular cylindrical batteries being charged to indicate the charging status, rather than illuminating pilot-lights using LEDs, etc. in locations separated from the batteries as in prior art battery chargers.

Further, the battery charger described above does not indicate battery charging status by brightly lighting a small area via pilot-lights. Rather, charging status is indicated by illuminating a large area of the surfaces of the circular cylindrical batteries being charged. Therefore, the battery charger has the characteristic that circular cylindrical battery charging status can be clearly indicated without glaring bright light emission.

In the battery charger of the present invention, the indicator 4 can be provided with an interchangeable color filter 7 disposed between the light sources 6 and the circular cylindrical batteries 3 and attached in an detachable manner to the inside surface of the battery compartment 2. Further, the interchangeable color filter 7 can be a colored translucent plate, and by passing light from the light sources 6 through the interchangeable color filter 7, the surfaces of the circular cylindrical batteries 3 can be illuminated with colors that are different from that of the light sources 6. This battery charger has the characteristic that by extremely simple attachment of an interchangeable color filter inside the battery compartment, light that is a different color than the light sources can be shined on the surfaces of the circular cylindrical batteries to indicate the charging status.

In the battery charger of the present invention, the indicator 4 can be provided with a plurality of interchangeable color filters 7 having different colors, and the surfaces of the circular cylindrical batteries 3 can be illuminated with different colors by changing the interchangeable color filter 7. This battery charger has the characteristic that the user can change the interchangeable color filter to indicate circular cylindrical battery charging status with a color of the user's preference. Further, it has the characteristic that circular cylindrical batteries loaded in the battery charger can be illuminated with a color that is optimal for the battery surface color to allow clear indication of the circular cylindrical batteries being charged.

In the battery charger of the present invention, the interchangeable color filters 7 can be colored translucent plates that are red, green, and blue. This battery charger has the characteristic that the user can select a preferred color from the red, green, and blue interchangeable color filters to indicate the charging status of the circular cylindrical batteries being charged.

In the battery charger of the present invention, the indicator 4 is provided with a timer 16 that starts counting when circular cylindrical batteries 3 are loaded in the battery compartment 2, and a control circuit 15 that switches the light sources 6 according to the timer 16 between a normal brightness mode and a low brightness mode, which is not as bright as the normal brightness mode. The control circuit 15 can activate the light sources 6 in the normal brightness mode when circular cylindrical batteries 3 are loaded in the battery compartment 2, and switch the light sources 6 to the low brightness mode when the timer 16 times-out. The battery charger described above clearly indicates charging status in the normal brightness mode when circular cylindrical battery charging is started, and subsequently switches to the low brightness mode to indicate battery charging status. Consequently, while battery charging status can be clearly indicated at night, the battery charger does not illuminate the inside of a bedroom with a brightness that interferes with falling asleep. In addition, energy consumption is reduced.

In the battery charger of the present invention, the circular cylindrical batteries 3 can be AA (double-A) batteries 3A. This battery charger can illuminate the surfaces of AA batteries loaded in the battery compartment to make the charging status easily discernable.

In the battery charger of the present invention, the circular cylindrical batteries 3 can be AA batteries 3A and AAA (triple-A) batteries 3B. This battery charger has the characteristic that AA batteries and AAA batteries loaded in the battery compartment can both be charged while clearly indicating the charging status of the AA batteries and the AAA batteries. In particular, even when AA batteries are replaced by thinner AAA batteries, the battery charger can clearly indicate the charging status by illuminating the battery surfaces using the same indicator. This is because light is shined in the lengthwise direction of the AA batteries to indicate their charging status. Therefore, even if AAA batteries, which are thinner than AA batteries, are loaded in the battery compartment, their surfaces can be illuminated to indicate the charging status.

The above and further objects of the present invention as well as the features thereof will become more apparent from the following detailed description to be made in conjunction with the accompanying drawings.

DETAILED DESCRIPTION OF THE PREFERRED EMBODIMENT(S)

The following describes embodiments of the present invention based on the figures.

The battery charger shown in FIGS. 1-7 is provided with a case 1 having a battery compartment 2 exposed from the surface of the case 1 to load a plurality of rechargeable circular cylindrical batteries 3 arranged in parallel orientation in a detachable manner, a charging circuit (not illustrated) housed in the case 1 to charge the batteries loaded in the battery compartment 2, and a charging status indicator 4 that detects the charging status of batteries loaded in the battery compartment 2 and indicates the battery charging status by light illumination conditions.

In the battery charger of FIGS. 1-5, the circular cylindrical batteries 3 are AA batteries 3A and AAA batteries 3B. The battery charger charges both AA batteries 3A and AAA batteries 3B loaded in the battery compartment 2. However, the battery charger of the present invention is not limited to circular cylindrical batteries that are AA batteries and AAA batteries. The circular cylindrical batteries can be only AA batteries, only AAA batteries, or any circular cylindrical batteries other than AA batteries and AAA batteries.

The case 1 is made of plastic and has an upper case 1A and a lower case 1B that are fabricated separately from molded plastic. The upper case 1A is attached in a manner that closes-off the open area of the lower case 1B and the charging circuit (not illustrated) is enclosed inside. The upper case 1A is provided with a cavity that forms the battery compartment 2.

Figure 5:
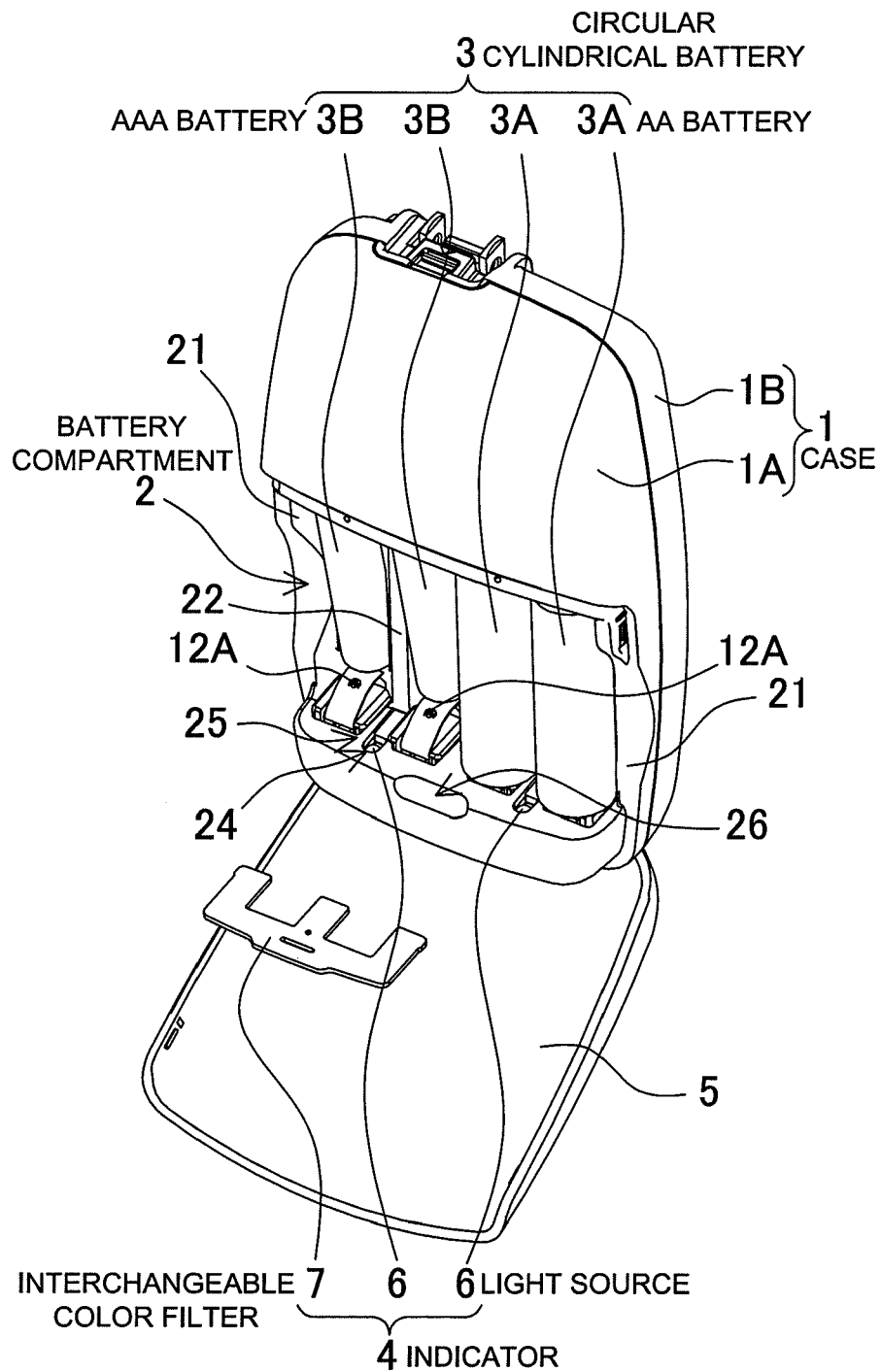
FIG. 5 is an oblique view showing the battery charger in FIG. 1 with the transparent cover opened.
Figure 6:
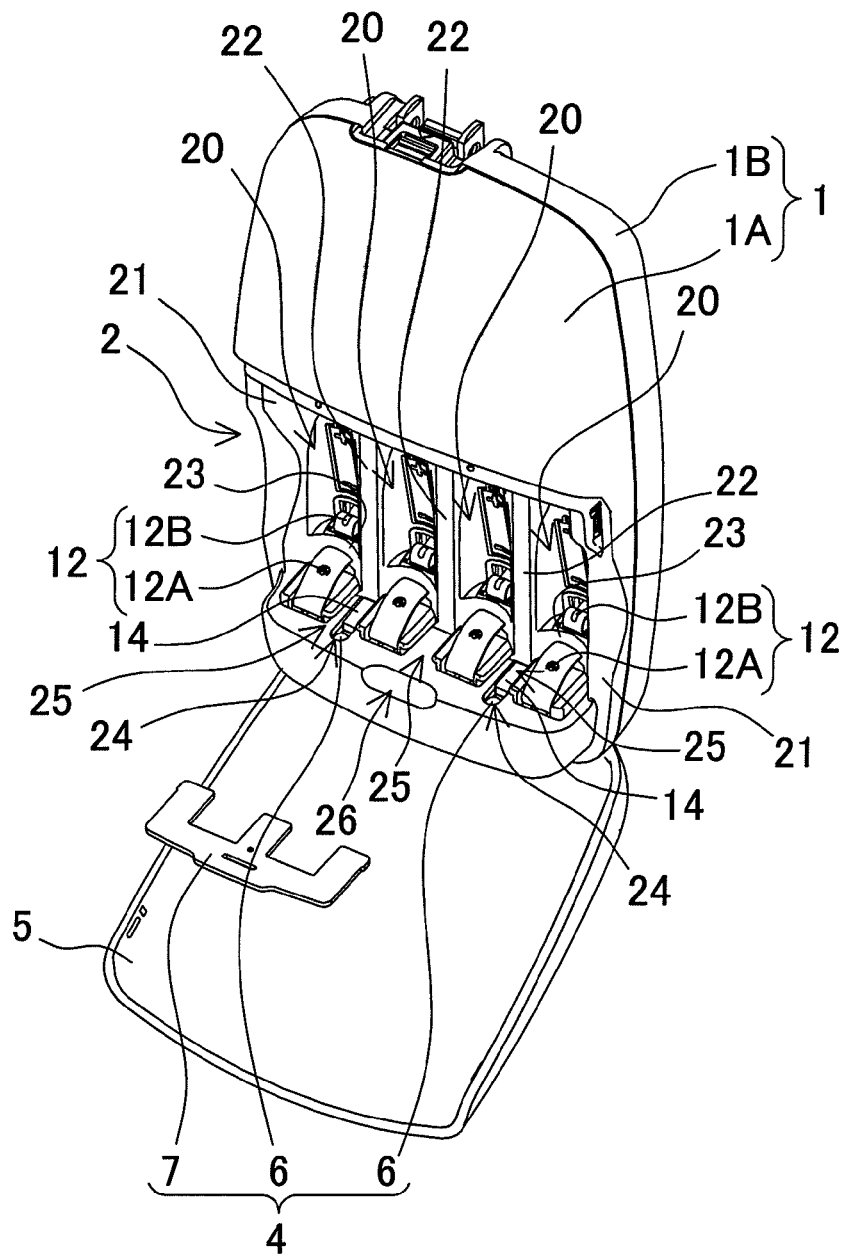
FIG. 6 is an oblique view showing the battery charger in FIG. 5 with the circular cylindrical batteries removed.

The battery compartment 2, where rechargeable circular cylindrical batteries 3 are loaded in a detachable manner, is established in the upper case 1A. The case 1 shown in FIGS. 6 and 7 has a cavity that serves as the battery compartment 2 provided in the lower end (in the figure) of the upper case 1A. Space for housing the electronic components of the charging circuit is provided above the battery compartment 2 inside the upper case 1A. The case 1 of FIGS. 5-7 is provided with a battery compartment 2 that allows four circular cylindrical batteries 3 to be loaded in parallel orientation.

In addition, the case 1 of the figures is provided with a transparent cover 5 that closes the open region of the battery compartment 2. The transparent cover 5 is connected to the case 1 in a manner allowing it to open and close the battery compartment 2 open region. The case 1 of the figures is provided with a pair of slits 27 at the outsides of the bottom end of the case 1 for connection of the transparent cover 5 in a manner that allows it to open and close. The slits 27 have connecting projections 28 that protrude from the inside surfaces. The connecting projections 28 allow the transparent cover 5 to connect to the case 1 in a manner allowing rotation. The transparent cover 4 of FIG. 7 is provided with a pair of connecting arms 51 that that allow it to open and close the battery compartment 2. The connecting arms 51 protrude from the inside surface on both sides of the bottom of the transparent cover 4 and are formed as single-piece with the transparent cover 4. The connecting arms 51 are provided with connecting depressions 52 in the inside surfaces opposite the connecting projections 28 inside the slits 27 in the case 1. The connecting arms 51 of the transparent cover 5 are inserted into the slits 27 in the case 1, and the connecting projections 28 are inserted into the connecting depressions 52 to connect the transparent cover 5 the case 1. The transparent cover 5 is connected to the case 1 in a manner that allows it to pivot around the connecting depressions 52 to open and close the battery compartment 2 in the case 1.

Figure 7:
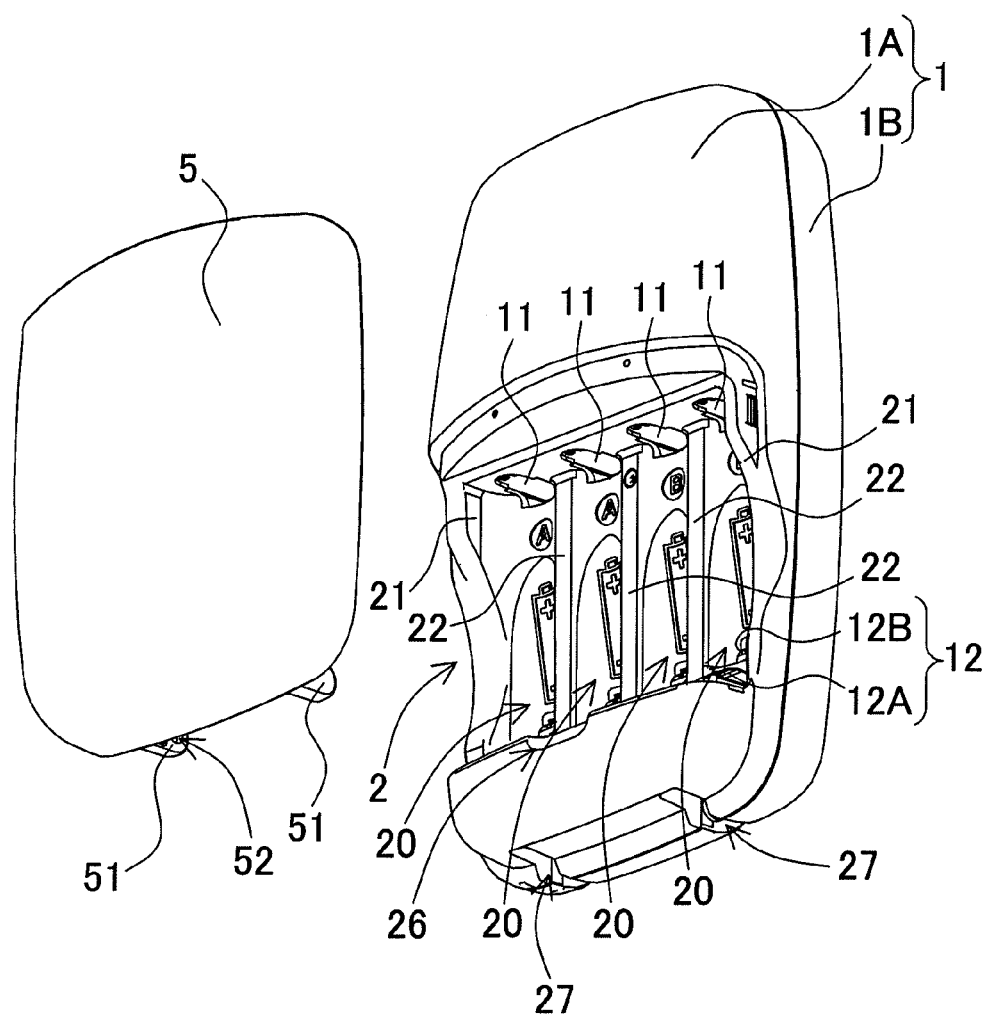
FIG. 7 is an exploded oblique view viewed from below showing the battery charger in FIG. 6 with the transparent cover removed.

As shown in FIG. 7, the transparent cover 5 connects to the case 1 in a detachable manner. The transparent cover 5 of the figure connects to the case 1 by inserting the connecting arms 51 into the slits 27 in the case 1 and inserting the connecting projections 28 into the connecting depressions 52. The transparent cover 5 is detached from the case 1 by disengaging the connecting arm 51 connecting depressions 52 from the connecting projections 28. Accordingly, a transparent cover 5 that is detachable from the case 1 has the characteristic that it can be attached or detached as required by user preference and operating conditions.

In a case 1 that has a transparent cover 5, the indicator 4 light sources 6 illuminate the inside surface of the transparent cover 5 to allow clear indication of the charging status of the batteries. Further, the transparent cover 5 can close-off the battery compartment 2 to charge the circular cylindrical batteries 3 in a manner that prevents the batteries from falling out of the battery charger. However, the battery charger of the present invention does not necessarily require a transparent cover over the battery compartment, and batteries can also be charged with the battery compartment open. A battery charger with no transparent cover can charge circular cylindrical batteries while efficiently radiating the heat due to charging.

As shown in FIGS. 6 and 7, the battery compartment 2 is provided with four battery holder 20 rows that can hold four circular cylindrical batteries 3 aligned in parallel orientation. The battery compartment 2 is provided with side-walls 21 on both sides and three rows of parallel partition walls 22 to establish the four rows of battery holders 20. The battery holders 20 on both sides are established between the side-walls 21 and partition walls 22, and the two center battery holders 20 are established between the three rows of partition walls 22. Each battery holder 20 is shaped to hold circular cylindrical batteries 3 that are either AA batteries 3A or AAA batteries 3B. Since AA batteries 3A are wider and longer than AAA batteries 3B, one end of the battery holders 20, which is the negative electrode terminal end of the circular cylindrical batteries 3 in the figures, has stepped regions 23 to insert AAA batteries 3B and to support AA batteries 3A from below. Shorter and narrower AAA batteries 3B insert inside the lower level of the stepped regions 23, and longer and wider AA batteries 3A are supported on the upper level of the stepped regions 23.

The case 1 is provided with output terminals 11, 12 disposed at both (the positive and negative) ends of the battery holders 20 in the battery compartment 2 to contact the positive and negative electrode terminals of the circular cylindrical batteries 3. Common output terminals 11 that contact the positive electrode terminals of both AA batteries 3A and AAA batteries 3B are provided at the positive end. The negative end has output terminals 12A disposed to contact the negative electrode terminals of AA batteries 3A and separate output terminals 12B disposed to contact the negative electrode terminals of AAA batteries 3B. Output terminals 12A that contact the negative electrode terminals of AA batteries 3A are disposed on the upper level of the stepped regions 23, and output terminals 12B that contact the negative electrode terminals of AAA batteries 3B are disposed on the lower level of the stepped regions 23. A AA battery 3A loaded in a battery holder 20 has its positive electrode terminal in contact with the common output terminal 11 and its negative electrode terminal in contact with the output terminal 12A disposed on the upper level of the stepped region 23. A AAA battery 3B loaded in a battery holder 20 has its positive electrode terminal in contact with the common output terminal 11 and its negative electrode terminal in contact with the output terminal 12B disposed on the lower level of the stepped region 23. AA batteries 3A and AAA batteries 3B are charged with their positive electrode terminals in contact with the common output terminals 11 and their negative electrode terminals in contact with the output terminals 12 disposed at the stepped regions 23.

Figure 8:
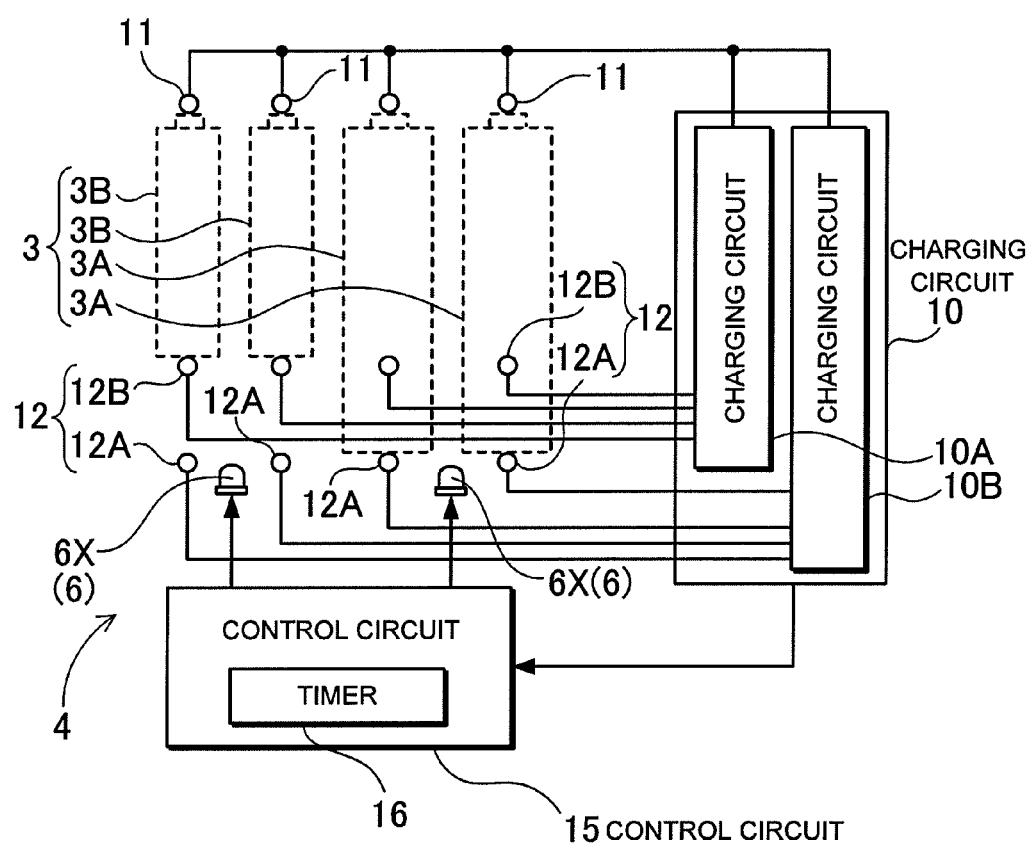
FIG. 8 is a block diagram showing the charging circuit and indicator of a battery charger for an embodiment of the present invention.

The charging circuit charges AA 3A and AAA 3B circular cylindrical batteries 3 via the positive and negative output terminals 11, 12. The charging circuit charges the circular cylindrical batteries 3 to full-charge, and detects full-charge to stop charging. The charging circuit charges the circular cylindrical batteries 3 with current and voltage that is optimum for that type of circular cylindrical battery 3. FIG. 8 shows a block diagram of a charging circuit that charges AA batteries 3A and AAA batteries 3B. This charging circuit 10 is provided with a charging circuit 10A for charging AA batteries 3A and a charging circuit 10B for charging AAA batteries 3B. The AA batteries 3A and AAA batteries 3B are alkaline batteries such as nickel hydride batteries or nickel cadmium batteries. These types of alkaline batteries are charged to full-charge by constant current charging. The charging circuit 10 determines full-charge by detecting the peak voltage of the battery being charged, or by detecting a ΔV voltage drop from the peak voltage. Since the optimum charging current is different for AA batteries 3A and AAA batteries 3B, the charging circuit 10 controls the charging current to the optimum value for charging AA batteries 3A and for charging AAA batteries 3B.

Figure 1:
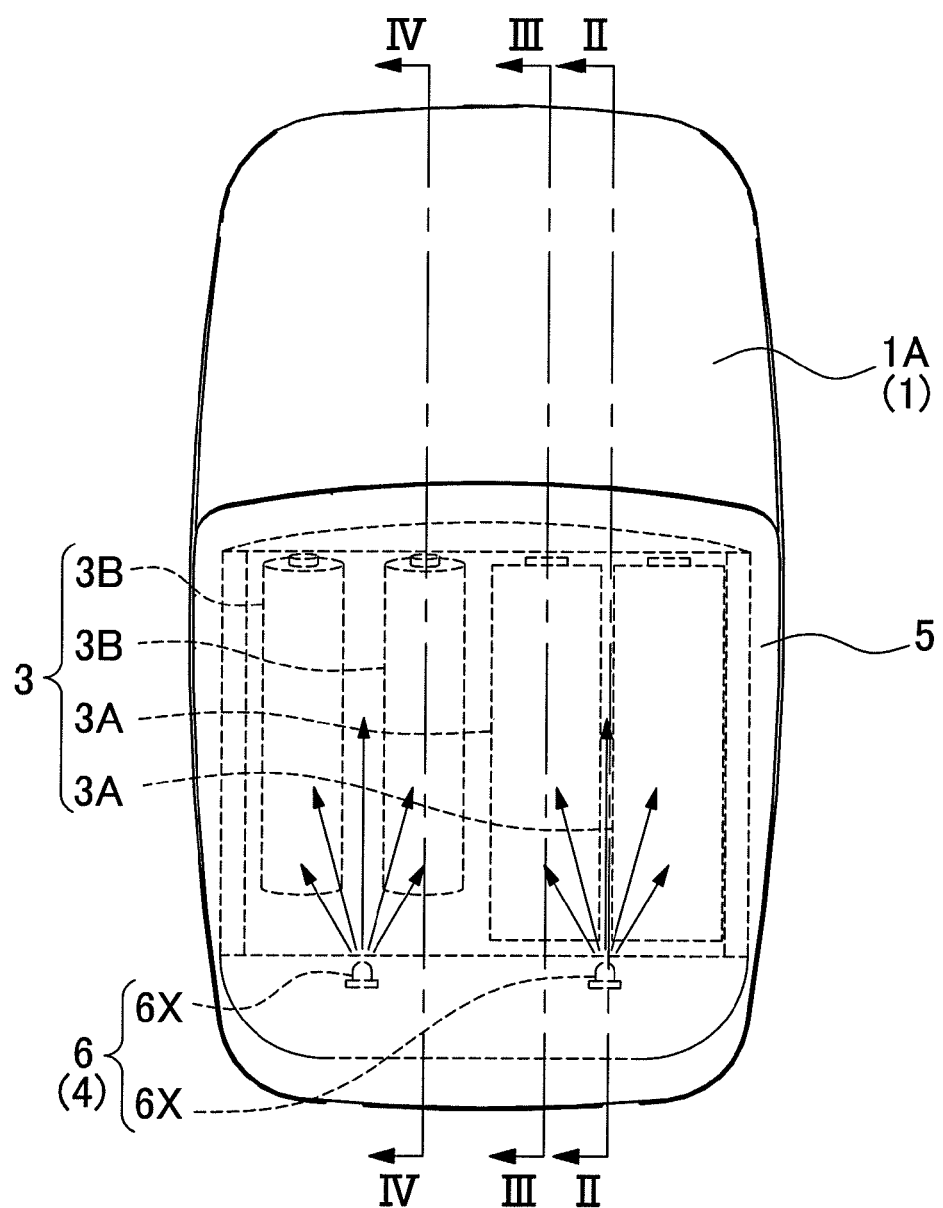
FIG. 1 is a plan view of a battery charger for an embodiment of the present invention.
Figure 2:
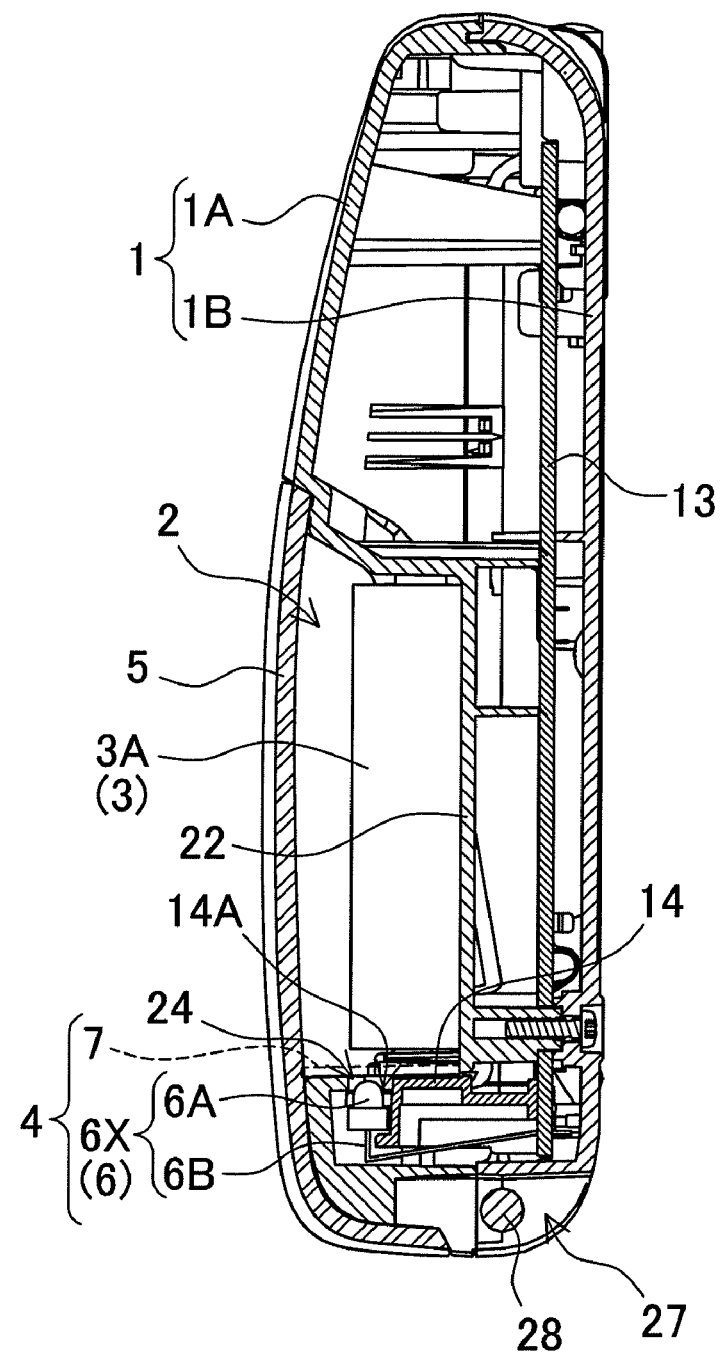
FIG. 2 is a cross-section through the line II-II of the battery charger shown in FIG. 1.
Figure 3:
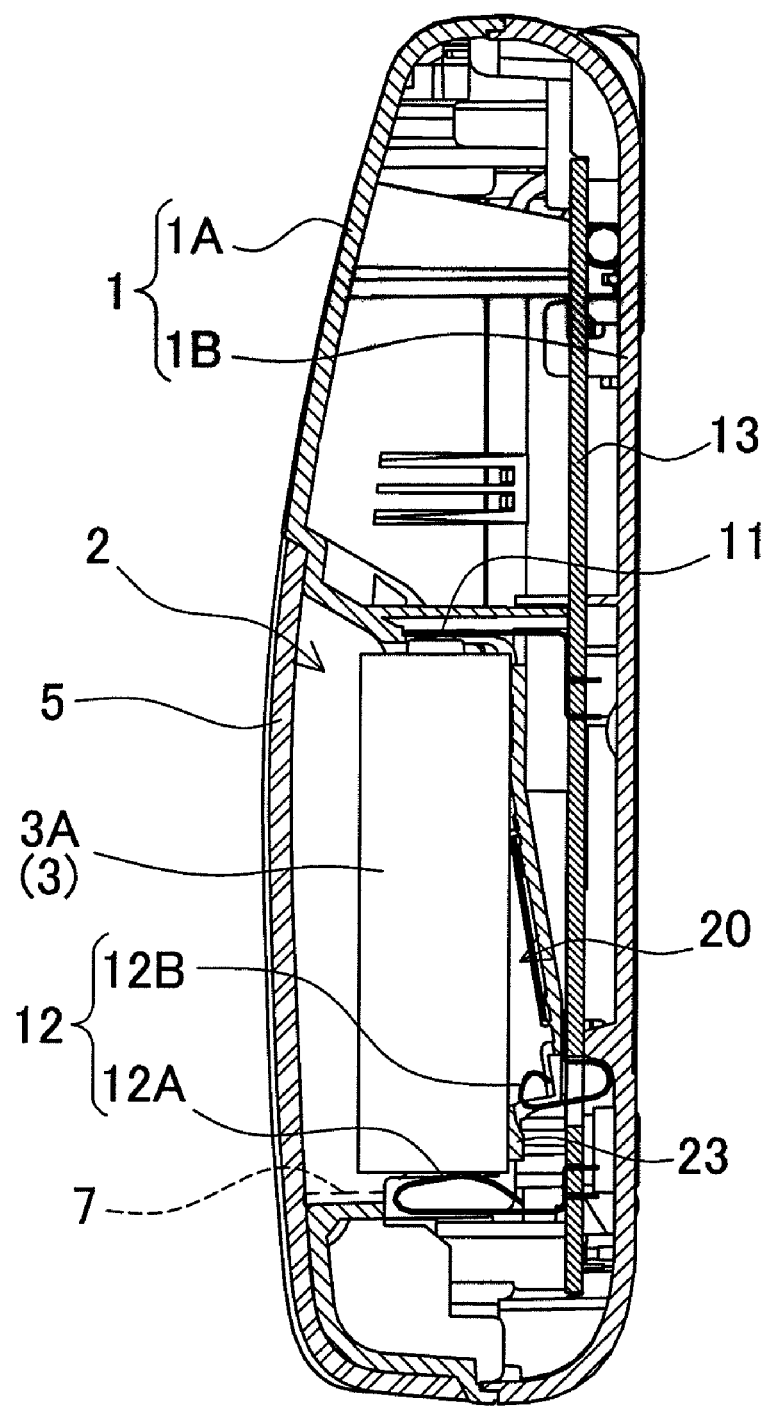
FIG. 3 is a cross-section through the line III-III of the battery charger shown in FIG. 1 showing an AA battery loaded in the battery charger.
Figure 4:
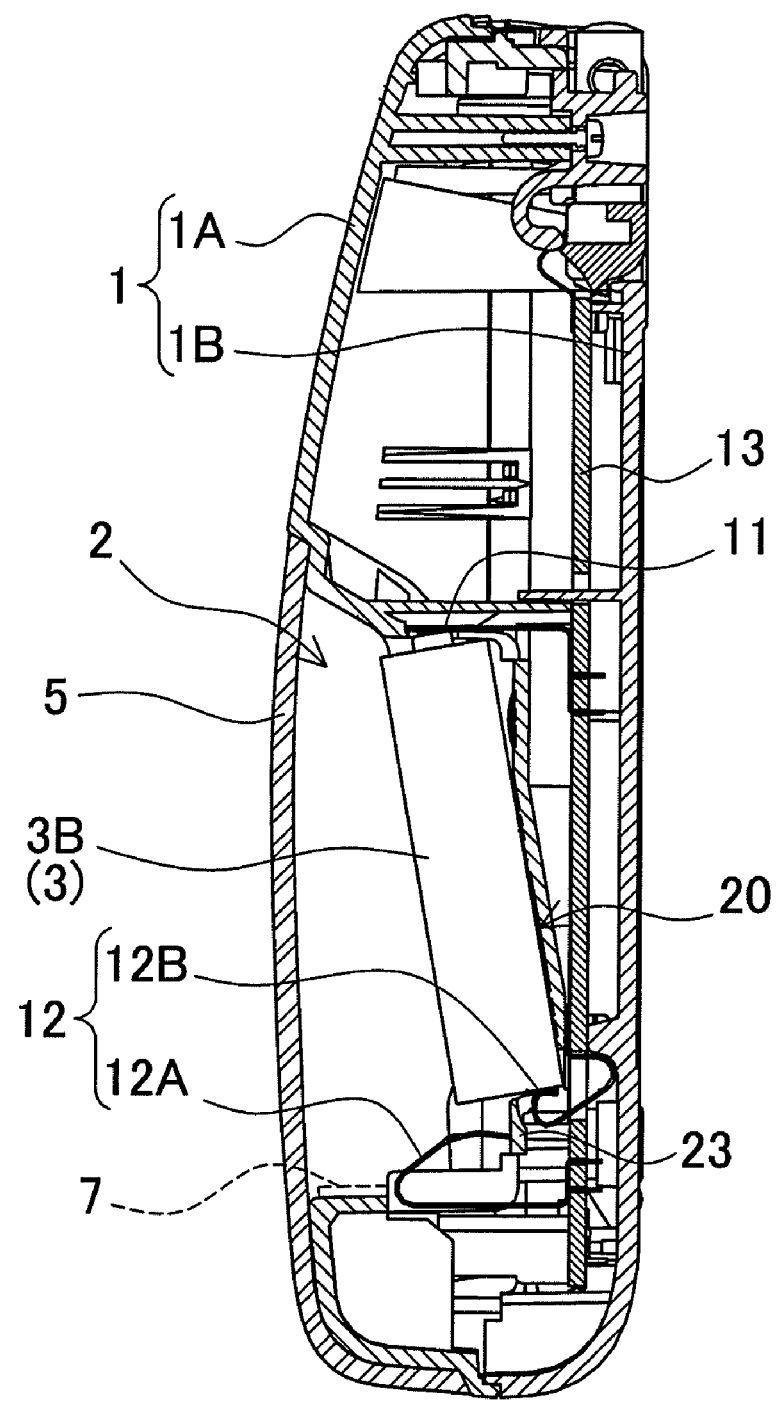
FIG. 4 is a cross-section through the line IV-IV of the battery charger shown in FIG. 1 showing an AAA battery loaded in the battery charger.
Figure 9:
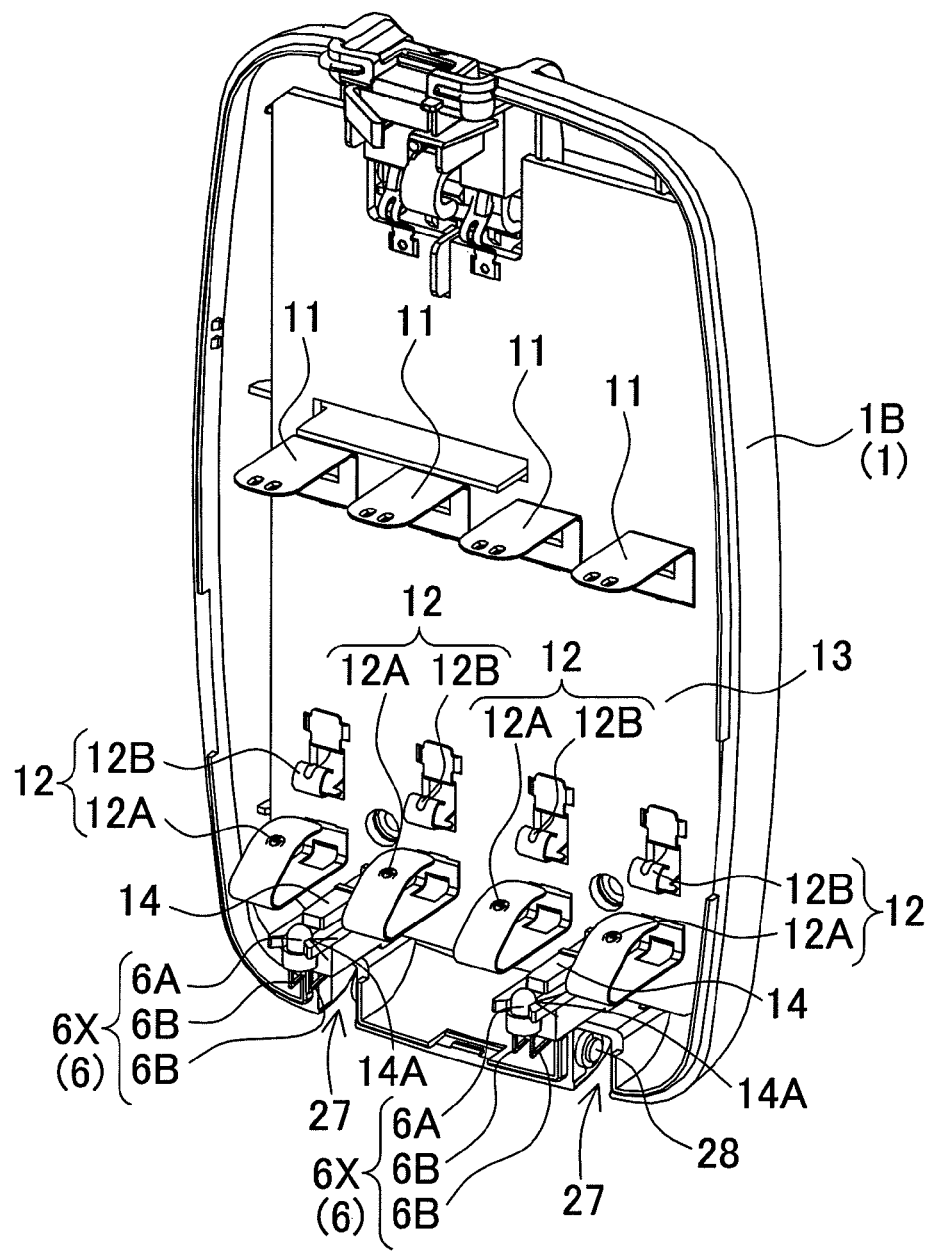
FIG. 9 is an oblique view showing the internal structure of the battery charger in FIG. 5.

The indicator 4 is provided with light sources 6 disposed at the end of the battery compartment 2 that shine light from between adjacent parallel oriented circular cylindrical batteries 3 in the lengthwise direction along the surfaces of the circular cylindrical batteries 3 loaded in the battery compartment 2. The battery compartment 2 of FIGS. 1, 2, 5, and 6 has circular cylindrical batteries 3 disposed extending in the vertical direction, and has light sources 6 disposed at the bottom end of the battery compartment 2 that shine light upward. As shown in FIG. 1, the light sources 6 shine upward from the bottom ends of the circular cylindrical batteries 3 to shine light on the surfaces of adjacent circular cylindrical batteries 3 and indicate the charging status of the circular cylindrical batteries 3 loaded in the battery compartment 2. The light sources 6 are light emitting diodes (LEDs) 6× that are disposed in fixed positions via light source holders 14 attached inside the case 1. The light source holders 14 are made of plastic and attached to the circuit board 13 mounted inside the case 1 to hold the LED 6× light sources 6 in fixed positions. The light source holders 14 of FIG. 9 are provided with insertion notches 14A where the light emitting sections 6A of the LEDs 6× are inserted and held in fixed positions. The leads 6B of the LEDs 6× are bent in L-shapes, the ends of the leads 6B are inserted through the circuit board 13, and the ends of the leads 6B are attached to the circuit board 13 by a method such as soldering. The LEDs 6×, which have their leads 6B bent in L-shapes, shine light from the light emitting sections 6A in the lengthwise direction of the circular cylindrical batteries 3. To shine light on the surfaces of the circular cylindrical batteries 3, the LED 6× light sources 6 are disposed between the metal-plate output terminals 12A established at the stepped regions 23. The case 1 is provided with light passageways 24 that pass LED 6× light through to the battery compartment 2. The light passageways 24 are through-holes established in the case 1 or transparent regions in the case 1 to pass the LED 6× light. Since the output terminals 12A are metal-plates, they do not pass light. Accordingly, the light passageways 24 are established between the output terminals 12A to allow light to shine in the battery compartment 2. The case 1 of FIGS. 5 and 6 has light passageways 24 established between the two rows of circular cylindrical batteries 3 disposed on either side, and LED 6× light sources 6 are disposed inside those light passageways 24. The light passageways 24 are disposed between the output terminals 12A that contact the negative electrode terminals of AA batteries 3A to shine light into the valleys formed between AA batteries 3A and AAA batteries 3B.

The indicator 4 of FIGS. 5, 6, 10, and 11 is provided with interchangeable color filters 7 that attach to the inside surface of the battery compartment 2 in a detachable manner. An interchangeable color filter 7 is a colored translucent plate. Light that passes through an interchangeable color filter 7 becomes a color that is different than the light emitted by the light sources 6, and that light shines on the surfaces of the circular cylindrical batteries 3. The indicator 4 is provided with a plurality of interchangeable color filters 7 of different colors, and the surfaces of the circular cylindrical batteries 3 can be illuminated with different colors by changing the interchangeable color filter 7. For example, the interchangeable color filters 7 can be three translucent plates colored red, green, and blue. The red interchangeable color filter 7 shines light source 6 light that is colored red onto the circular cylindrical battery 3 surfaces, the green interchangeable color filter 7 shines light source 6 light that is colored green onto the circular cylindrical battery 3 surfaces, and the blue interchangeable color filter 7 shines light source 6 light that is colored blue onto the circular cylindrical battery 3 surfaces. The interchangeable color filters 7 are interchanged by the user to shine different colored light on the surfaces of the circular cylindrical batteries 3.

The light sources 6 that shine through an interchangeable color filter 7 are white-light LEDs 6×. White-light LEDs 6× emit light that includes component colors that are the colors of the interchangeable color filters 7. When light from these light sources 6 pass through an interchangeable color filter 7, the light is converted to the color of the interchangeable color filter 7 and shines on the surfaces of the circular cylindrical batteries 3.

Figure 10:
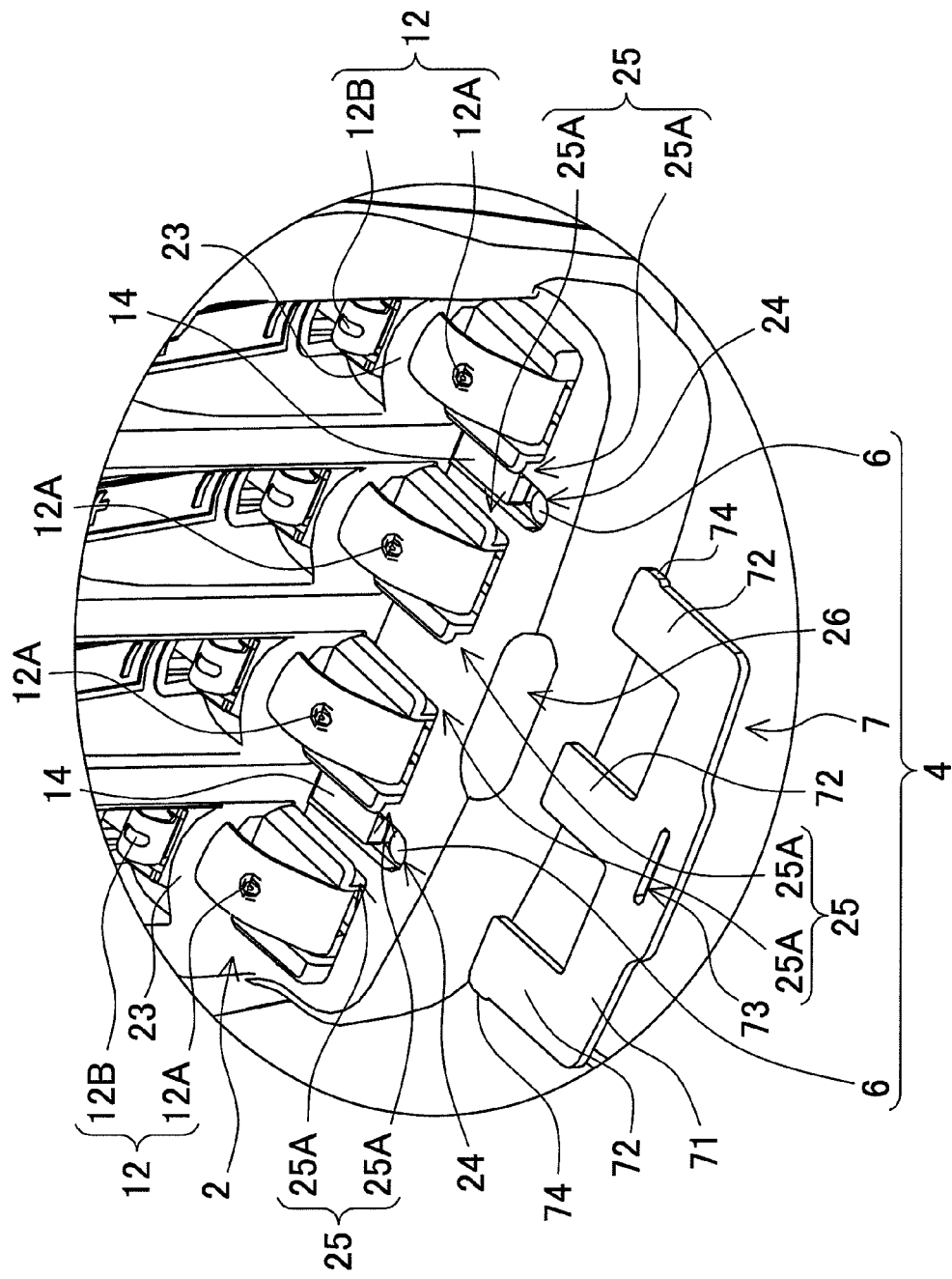
FIG. 10 is an enlarged oblique view showing connection of the interchangeable color filter to the case of the battery charger in FIG. 6.

The interchangeable color filter 7 attaches to the inside surface of the battery compartment 2 to cover the light passageways 24 in a detachable manner. The interchangeable color filter 7 changes the color of the light source 6 light that passes through the light passageways 24 and illuminates the surfaces of the circular cylindrical batteries 3. The interchangeable color filter 7 of FIG. 10 is a translucent plastic plate with a comb shape having a connecting plate 71 and a plurality of branch plates 72. The branch plates 72 are disposed to insert between the output terminals 12A. Light that shines from the light passageways 24 into the battery compartment 2 passes through the interchangeable color filter 7 to illuminate the surfaces of the circular cylindrical batteries 3. The interchangeable color filters 7 have pigment or dye micro-powder coloring added to the translucent plastic to color it red, green, and blue. Light reflects off the surfaces of the micro-powder coloring additive to scatter the light passing through the interchangeable color filter 7. Light internally scattered in the interchangeable color filter 7 is emitted from the interchangeable color filter 7 over a wide area to shine diffused light onto the circular cylindrical batteries 3. Consequently, an indicator 4, which shines light from the light sources 6 through an interchangeable color filter 7 onto the surfaces of the circular cylindrical batteries 3, uniformly illuminates the circular cylindrical battery 3 surfaces to more clearly indicate the battery charging status.

Figure 11:
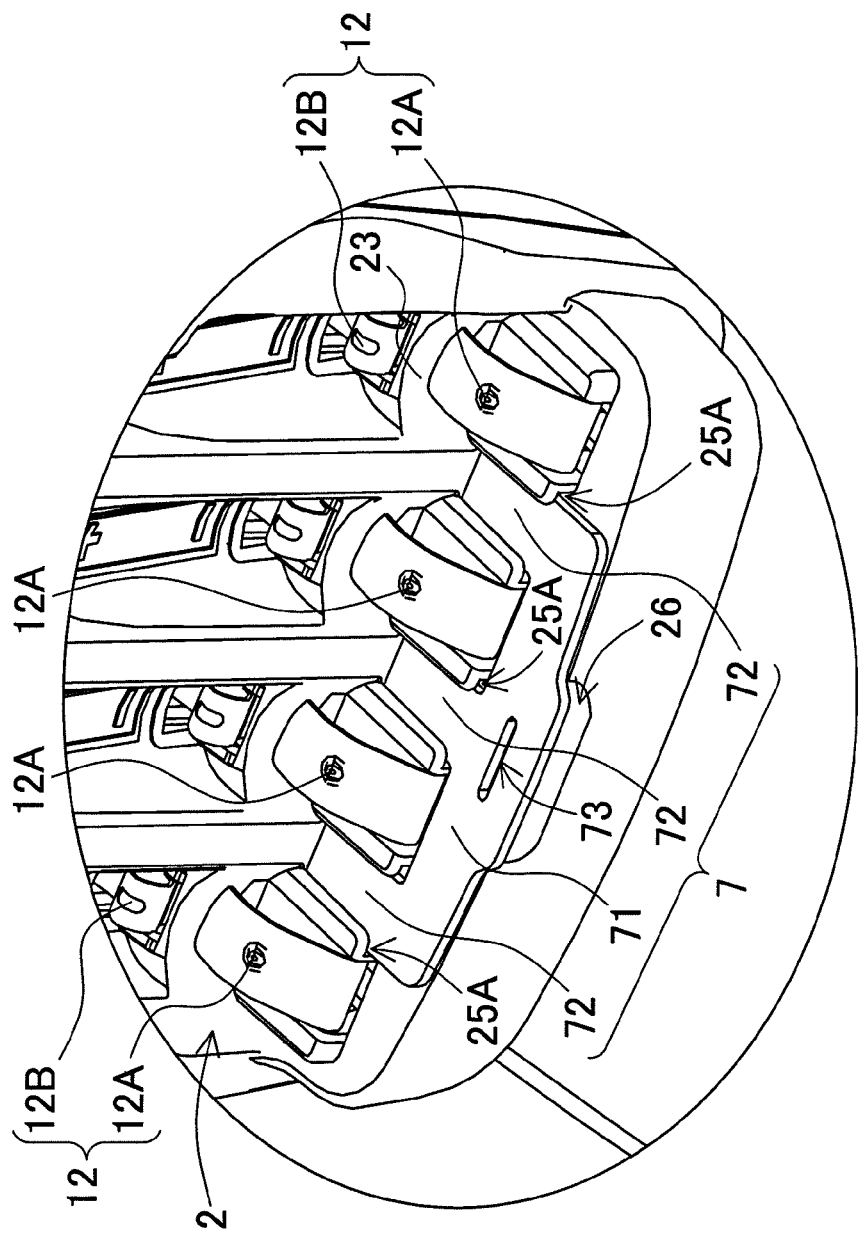
FIG. 11 is an enlarged oblique view showing the interchangeable color filter attached to the case of the battery charger in FIG. 10.

The inside surface of the battery compartment 2 is provided with attachment slots 25 that allow an interchangeable color filter 7 to be attached in a detachable manner. The attachment slots 25 are provided with guide grooves 25A disposed in opposing pairs between the AA battery 3A output terminals 12A. The guide grooves 25A interconnect with the interchangeable color filter 7 by sandwiching both sides of each branch plate 72. Both sides of each branch plate 72 fit into corresponding guide grooves 25A to insert the interchangeable color filter 7 in a fixed position on the inside surface of the battery compartment 2 in a manner that does not easily fall out. The interchangeable color filter 7 of FIG. 10 is provided with retaining projections 74 that protrude to the outside from the ends of the branch plates 72 on both sides to prevent the inserted branch plates 72 from easily falling out of the attachment slots 25. Accordingly, the ends of the attachment slot 25 guide grooves 25A that mate with the retaining projections 74 are provided with interlocking cavities (not illustrated) that hold the retaining projections 74. The retaining projections 74 on the interchangeable color filter 7 branch plates 72 inserted in the attachment slots 25 interlock with the interlocking cavities in the guide grooves 25A to attach the interchangeable color filter 7 in the attachment slots 25 in a restrained manner that prevents it from easily falling out. Further, the interchangeable color filter 7 of FIGS. 10 and 11 is provided with a clasp 73 on the connecting plate 71 to allow the interchangeable color filter 7 to be easily detached from the attachment slots 25 in the battery compartment 2. The clasp 73 of the figures is a slit that passes through the connecting plate 71. This interchangeable color filter 7 can easily be detached from the attachment slots 25 when the user pulls the filter with a fingernail hooked in the clasp 73. A clasp can also be established on the interchangeable color filter connecting plate surface by providing a depression or projection instead of a slit. Further, the case 1 of FIG. 11 is provided with a gripping cavity 26 opposite the center of the connecting plate 71 that allows the user to easily attach and detach the interchangeable color filter 7 by holding the connecting plate 71. This structure has the characteristic that users can insert their fingertips in the gripping cavity 26 to grasp the connecting plate 71 and easily detach and attach the interchangeable color filters 7.

As shown in FIG. 8, the indicator 4 is provided with a control circuit 15 that controls the light sources 6 ON and OFF. The control circuit 15 is provided with a timer 16 that begins counting when circular cylindrical batteries 3 are loaded in the battery compartment 2. The control circuit 15 switches the brightness of the light sources 6 between a normal brightness mode and low brightness mode, which is not as bright as the normal brightness mode. When circular cylindrical batteries 3 are loaded in the battery compartment 2, the control circuit 15 controls the light sources 6 to emit in the normal brightness mode until the timer 16 times-out, and to emit in the low brightness mode after the timer 16 has timed-out. In addition, the control circuit 15 detects the charging status of the circular cylindrical batteries 3 to control activation of the light sources 6. For example, the control circuit 15 lights the light sources 6 when the circular cylindrical batteries 3 are being charged, and turns the light sources 6 OFF to indicate full-charge when the circular cylindrical batteries 3 have reached full-charge. Or, the control circuit 15 continuously lights the light sources 6 when the circular cylindrical batteries 3 are being charged, and flashes the light sources 6 ON and OFF to indicate full-charge when the circular cylindrical batteries 3 have reached full-charge. Or, the control circuit 15 flashes the light sources 6 ON and OFF when the circular cylindrical batteries 3 are being charged, and continuously lights the light sources 6 to indicate full-charge when the circular cylindrical batteries 3 have reached full-charge.

The battery charger, which is loaded with a plurality of circular cylindrical batteries 3, detects full-charge for each individual circular cylindrical battery 3. The battery charger stops charging circular cylindrical batteries 3 that have reached full-charge to charge all the circular cylindrical batteries 3 under ideal conditions. In particular, even when a plurality of circular cylindrical batteries 3 having different remaining capacities are loaded, all the batteries can be fully-charged without over-charging any of the batteries. In this battery charger, all of the circular cylindrical batteries 3 do not reach full-charge at the same time. The indicator 4 of FIGS. 1 and 5 has one light source 6 disposed between two rows of circular cylindrical batteries 3, and the surfaces of two rows of circular cylindrical batteries 3 are illuminated by a single light source 6. Since two light sources 6 indicate the charging status of circular cylindrical batteries 3 disposed in two rows on either side of this battery charger, the charging status of the two rows of circular cylindrical batteries 3 on either side can be displayed independently. For example, when the two rows of circular cylindrical batteries 3 on both sides reach full-charge, the light sources 6 can be flashed ON and OFF or can be held continuously ON to indicate full-charge.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2009-180908 filed in Japan on Aug. 3, 2009, the content of which is incorporated herein by reference.

What is claimed is:

1. A battery charger comprising:
   a case provided with a battery compartment where a plurality of circular cylindrical batteries are loaded in parallel orientation in a detachable manner;
   a charging circuit housed in the case to charge batteries loaded in the battery compartment; and
   a charging status indicator that detects the charging status of batteries loaded in the battery compartment and indicates battery charging status by the state of light illumination,
   wherein the indicator is provided with light sources disposed at the end of the battery compartment that shine light from between adjacent parallel circular cylindrical batteries in the lengthwise direction onto the surfaces of the circular cylindrical battery, and
   wherein the light sources shine light on the surfaces of adjacent circular cylindrical batteries to indicate the charging status of the circular cylindrical batteries loaded in the battery compartment.

2. The battery charger as cited in claim 1 wherein the indicator is provided with an interchangeable color filter disposed between the light sources and the circular cylindrical batteries and attached in an detachable manner to the inside surface of the battery compartment; the interchangeable color filter is a colored translucent plate; and by passing light from the light sources through the interchangeable color filter, the surfaces of the circular cylindrical batteries are illuminated with colors that are different from that of the light sources.

3. The battery charger as cited in claim 2 wherein the light sources are white light emitting diodes.

4. The battery charger as cited in claim 2 wherein the indicator is provided with a plurality of interchangeable color filters having different colors, and the surfaces of the circular cylindrical batteries can be illuminated with different colors by changing the interchangeable color filter.

5. The battery charger as cited in claim 3 wherein the interchangeable color filters are colored translucent plates that are red, green, and blue.

6. The battery charger as cited in claim 5 wherein the interchangeable color filters are translucent plastic with pigment or dye micro-powder coloring added to color the translucent plastic red, green, and blue; and light reflects off the surfaces of the micro-powder coloring additive to scatter the light passing through the interchangeable color filter.

7. The battery charger as cited in claim 1 wherein the indicator is provided with a timer that starts counting when circular cylindrical batteries are loaded in the battery compartment, and a control circuit that switches the light sources according to the timer between a normal brightness mode and a low brightness mode, which is not as bright as the normal brightness mode; the control circuit activates the light sources in the normal brightness mode when circular cylindrical batteries are loaded in the battery compartment, and switches the light sources to the low brightness mode when the timer times-out.

8. The battery charger as cited in claim 1 wherein the circular cylindrical batteries are AA batteries.

9. The battery charger as cited in claim 1 wherein the circular cylindrical batteries are AA batteries and AAA batteries.

10. The battery charger as cited in claim 1 wherein the case is provided with a transparent cover that closes the open region of the battery compartment; the transparent cover is connected to the case in a manner allowing it to open and close the battery compartment open region; and the indicator light sources illuminate the inside surface of the transparent cover to indicate the charging status of the batteries.

11. The battery charger as cited in claim 1 wherein the light sources are light emitting diodes (LEDs); light source holders are provided to dispose the LEDs in fixed positions; the light source holders have insertion notches where the light emitting sections of the LEDs are inserted and held in fixed positions; and the light source holders are attached to the case to hold the LED light sources in fixed positions.

12. The battery charger as cited in claim 11 wherein the leads of the LEDs are bent in L-shapes, and the ends of the leads are attached to a circuit board.

13. The battery charger as cited in claim 1 wherein the light sources are disposed between metal-plate output terminals that connect to the circular cylindrical batteries.

14. The battery charger as cited in claim 13 wherein an interchangeable color filter is a translucent plastic plate with a comb shape having a connecting plate and a plurality of branch plates, and the branch plates are disposed to insert between the output terminals.

15. The battery charger as cited in claim 14 wherein the interchangeable color filter is provided with a clasp on the connecting plate.

16. The battery charger as cited in claim 1 wherein the case is provided with light passageways that pass LED light through to the battery compartment, and the light passageways are through-holes established in the case or transparent regions that pass light.

17. The battery charger as cited in claim 1 wherein the indicator is provided with a control circuit that controls light source lighting, and the control circuit detects the charging status of the circular cylindrical batteries to control the state of light source lighting.

* * * * *